April 22, 1941. E. S. TAYLOR ET AL 2,239,063
BARREL ENGINE
Filed Sept. 10, 1938 3 Sheets-Sheet 2
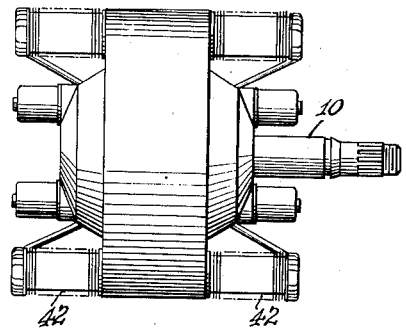
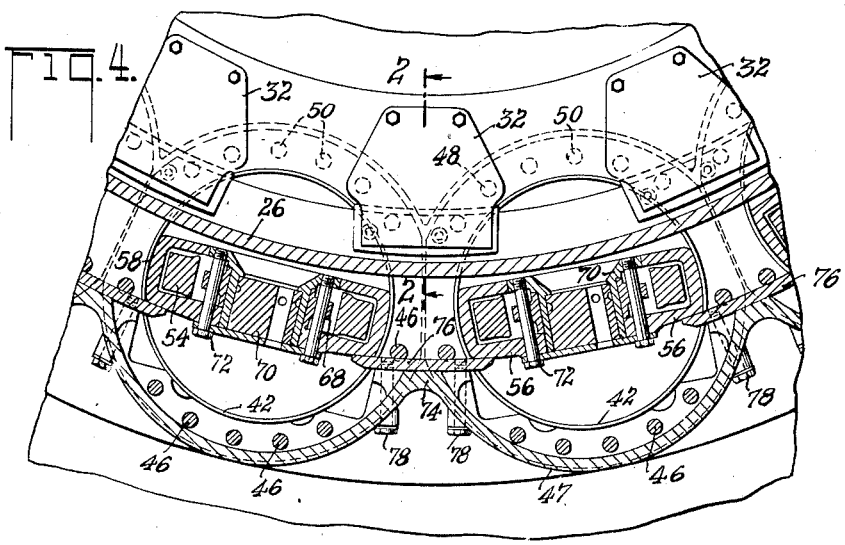
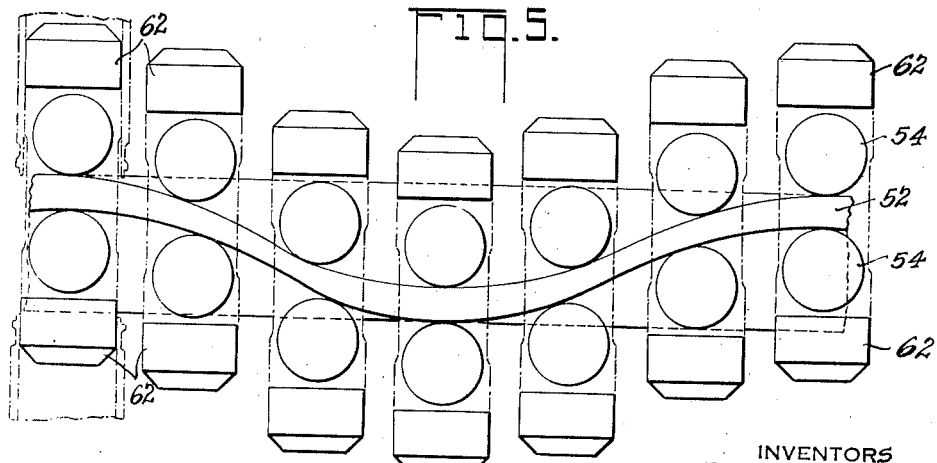
INVENTORS
EDWARD S. TAYLOR
AND ROLAND CHILTON
BY
ATTORNEY April 22, 1941.　　　E. S. TAYLOR ET AL　　　2,239,063
BARREL ENGINE
Filed Sept. 10, 1938　　　3 Sheets-Sheet 3
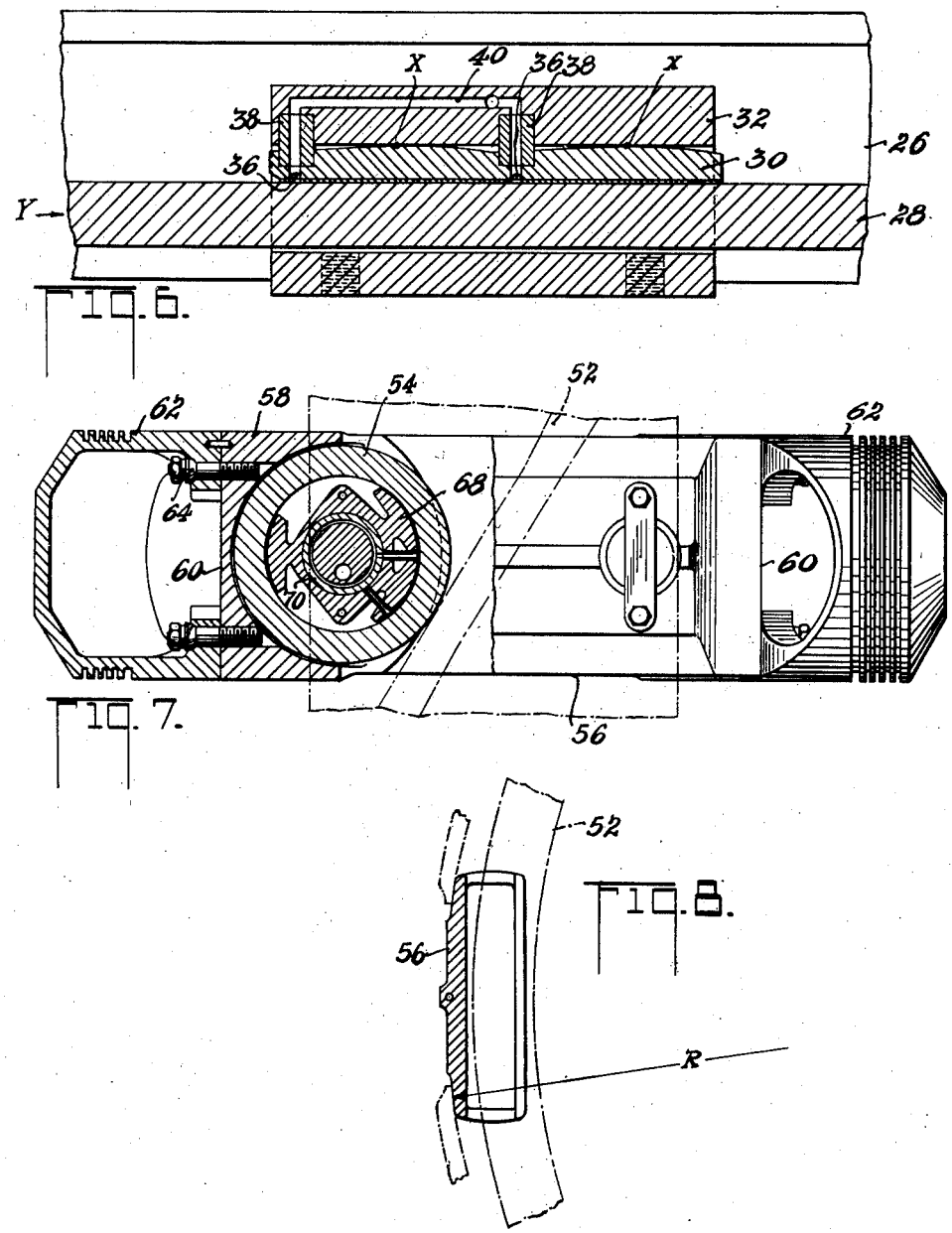
INVENTORS
EDWARD S. TAYLOR
AND ROLAND CHILTON
BY
ATTORNEY Patented Apr. 22, 1941

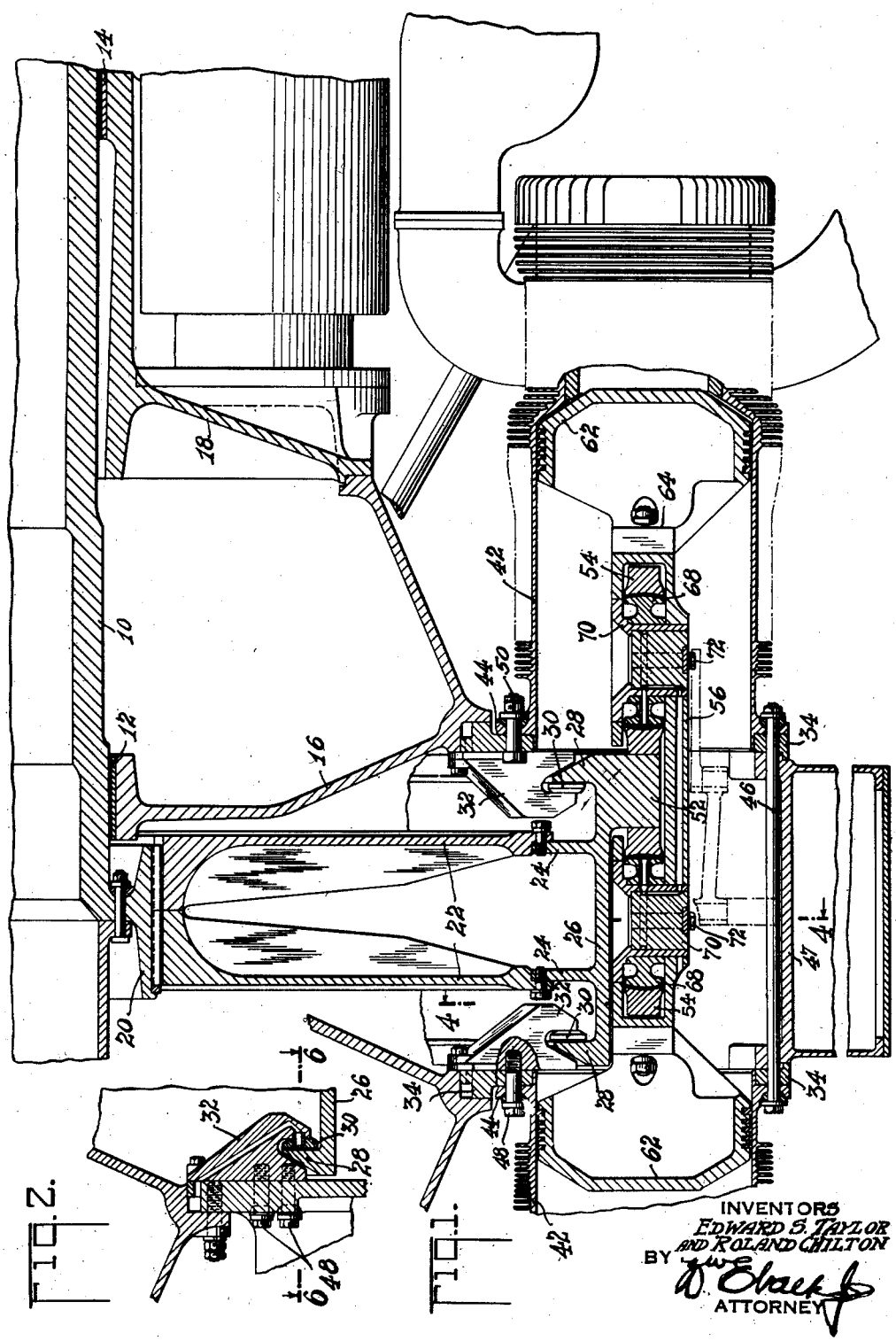

2,239,063

UNITED STATES PATENT OFFICE 2,239,063

BARREL ENGINE

Edward S. Taylor, Cambridge, Mass., and Roland Chilton, Ridgewood, N. J., assignors to Wright Aeronautical Corporation, a corporation of New York Application September 10, 1938, Serial No. 229,287

17 Claims. (Cl. 74—56)

This invention relates to improvements in cam type engines having cylinders arranged around and in parallelism to a power shaft and in certain respects comprises improvements on the copending application of Roland Chilton, Serial No. 220,453 filed July 21, 1938.

In engines of this class a cam having a circumferential waved rim of large radius, engages rollers carried in piston members arranged circumferentially about the cam. The pistons operate in cylinders extending from deck members comprising a housing surrounding the cam. The operating inertia and explosion loads apply axial loads to the cam rim at this large radius which, in conventional constructions, tends to tilt the cam, since this is normally stabilized on bearings and thrust means applied to the shaft, from which these loads have to be transmitted radially outwards to the cylinder deck.

The above identified application teaches a novel disposition wherein the thrust loads are resisted, near the circumference of the cam, by thrust means rigidly supported from the deck members, whereby the loads and reactions between the cylinder and cam are cancelled out through a small local "stress circuit" and the cam-disc, shaft and bearing housings are relieved of bending load. In this co-pending application there are disclosed rollers contacting plane tracks facing outwardly of the cam, whereby the explosion loads from any one cylinder are transmitted through the opposite side of the cam to the cylinder deck member opposite to that securing the instantly firing cylinder. According to the present invention, the disposition of the plane circumferential cam stabilizing tracks are reversed to face inwardly whereby the thrust means engaging the tracks are secured directly to the cylinder wherein the thrust loads are set up. In other words, the cam-rim thrust organization comprises a tie means between the opposed cylinder attachments.

Other objects and advantages of the invention reside in novel means for guiding the piston elements against rotation in the cylinder bores and other objects and advantages will be obvious from, or will be pointed out, in the following description with reference to the drawings, in which:

Fig. 1 is a fragmentary section through the axes of the power shaft and piston organization;

Fig. 2 is a detail section on the line 2—2 of Fig. 4;

Fig. 3 is a small diagram in outside view illustrating the general cylinder disposition;

Fig. 4 is an axial detail section on the line 4—4 of Fig. 1;

Fig. 5 is a developed diagram of the cam;

Fig. 6 is an enlarged section through the slippers and cam ring, comprising a developed section on the line 6—6 of Fig. 2;

Fig. 7 is a detail view of a piston member assembly, the left hand portion being in axial section;

Fig. 8 is a detail cross section through the center of a piston member.

Referring first to Fig. 1, 10 designates a power shaft supported in journal bearings 12 and 14 in housings 16—18 which bearings permit axial float of the shaft. An enlarged element 20 at the end of the shaft is provided with splines on which are shrunk opposed ribbed disc members 22, secured at their outer circumference to circumferential ribs 24, extending integrally and inwardly from a cylindrical cam drum 26. The cam drum 26 is provided at its opposed outer ends with inturned flanges 28 comprising inwardly facing plane track surfaces with which are engaged thrust slipper pads 30 carried in brackets 32 secured to annular cylinder deck members 34. The slippers are shown in enlarged circumferential section in Fig. 6 from which will be seen that the contacts between the slippers 30 and their supporting bracket 32 are localized to points "X" intermediate the ends of the slipper elements. The direction of rotation of the cam track 28 is indicated by the arrow "Y" so that the "leading edges" of the slippers occur at the left hand end of each, where oil grooves 36 are provided, fed by hollow floating dowels 38 which communicate with suitable oil pressure passages 40. The supporting points "X" are preferably slightly to the rear of the mid-length of each slipper element to establish the hydro-dynamic entrainment of oil according to the well known theory of slipper bearings.

Secured to the opposed annular deck members 34 are cylinders 42 which have the usual integral flanges 44 engaged by securing bolts as follows:

Around the outer part of the periphery of each cylinder the entire structure is secured by through bolts 46 (see Fig. 4), these through bolts serving to clamp the cylinders against the deck member 34 and to secure the latter on either side of the housing drum 47. On the inner circumference of the cylinder flanges 44 certain of the bolts comprise cap screws 48 which go through the deck member 34 and screw directly into the cam thrust slipper brackets 32 while other bolts 50 engage the deck members 34 close to the slipper brackets 32.

Exteriorly of the cam drum 26 is formed the cam rim 52 which is waved in sinusoidal form as shown in the developed diagram of Fig. 5 and is engaged between rollers 54 of piston members later to be described in detail.

Important provisions of the invention reside in the slipper and cam organization so far described. It will be seen that the explosion loads applied to the cam at any one roller contact are resisted directly by the adjacent slippers 30 and that the supporting brackets 32 of these slippers are secured to the decks 34 and the local cylinder by an extremely direct and rigid connection including bolt means 48 which actually pass directly from the cylinder flange to the cooperating slipper bracket 32. In this way, the stress path through which the explosion forces cancel out is extraordinarily short and hence the gross amount of material comprising the highly stressed elements of the structure is unusually small, whereby a substantial saving in the weight is achieved. Furthermore, this compactness in the cam and its supporting structure result in important savings in the overall length over the opposed cylinders as compared to conventional practice.

The piston elements shown best in Figs. 7 and 8 consist of a main member or backbone 56 cutaway as indicated in Fig. 8 to clear the cam and comprising on either side thereof hollow roller pockets of approximately rectangular cross section. One wall of these pockets comprises an integral continuation of the connecting section 56 while the integral elements disposed circumferentially of the roller are turned to an exterior diameter to conform to the cylinder bore, comprising slippers slidably guided as indicated at 58 of Fig. 7. The outer end surfaces 60 are formed for abutment with pistons 62 which are secured by inturned flange and stud connections as indicated at 64 of Fig. 7.

The cam engaging rollers 54 are disposed within the pockets just described on a suitable slipper journal bearing 68, carried on a hollow pin member 70 tightly fitted to the piston member 56 and additionally secured therein by bolts 72 as seen in Figs. 1, 4, and 7.

The drum or housing member 26, which is sandwiched between the deck members 34 by the through bolts 46 as previously described, has, intermediate each pair of cylinders, elements 74 which are bored cylindrically about the main axis of the engine, i. e., the axis of the shaft 10. To the local arcuate abutment faces thus formed there are fitted arcuate segmental guiding plates 76 which may be retained in position by suitable cap screws 78, Fig. 4, and which plates extend to overlap the piston members 56, the outer elements of which are formed to an arc of radius "R" (Fig. 8) to comprise a longitudinal slipper against the segments 76, whereby the pistons are located against turning. In the drawings as in Fig. 4 certain of the through bolts 46 securing the cylinders are shown disposed on the inner side of the piston guiding plates 76.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an engine, a cam comprising a cylindrical drum, rims on said drum comprising inwardly facing plane tracks, a cam rim on said drum, slipper means engaging said tracks, piston members having rollers engaging said cam, cylinders cooperating with said piston members and means to secure said slipper means directly to said cylinders.

2. An engine including in combination, a power shaft, a pair of opposed cylinders axially parallel to said shaft, opposed cylinder-deck members, thrust means having slippers facing respective cylinders, a cam rigid with said shaft and having vis-a-vis tracks engaging said slippers and a piston member slidable in said cylinders having rollers engaging said cam, and common means securing said cylinders and said thrust means to respective deck members.

3. In an engine in combination, a pair of spaced cylinder deck members, a cam rotatable between said members and having a pair of plane track surfaces facing towards each other, bearing pad members engaging said tracks, cylinders abutting said deck members in overlapping relation to said bearing members and means for securing together said cylinders and members.

4. In an engine in combination, a power shaft, spaced disc members secured to said shaft, a cam including a cylindrical drum having circumferential ribs secured to said discs, inturned rim members on said cam comprising plane circumferential tracks facing each other, an axially waved cam rim on said drum, slipper brackets overlapping said tracks, cylinders having flange means overlapping said tracks, securing means extending through said flanges into said brackets, piston members slidable in said cylinders and rollers mounted in said members and engaging said cam.

5. In an engine, a cam having an opposed pair of inturned plane tracks, slipper bracket members overlapping said tracks, cylinders overlapping said brackets and securing means engaging said cylinders and brackets in common.

6. In an engine having a power shaft and an annular cam rim rigid therewith and subject to axial thrust, thrust means comprising vis-a-vis track means rigid with said cam having plane surfaces, thrust brackets engaging said surfaces, cylinders having securing elements overlapping said brackets and securing means engaged in said elements and brackets.

7. In an engine, a power shaft, a cam thereon, coaxial opposed cylinders axially parallel to said shaft, a piston carrying member having longitudinal elements comprising spaced guide surfaces, pistons secured to the ends of said member engaging respective cylinders a housing surrounding said cam and having abutment faces intermediate said cylinders, and piston member guiding means comprising plates secured to said surfaces and cooperating with said piston member guiding surfaces.

8. An engine including a plurality of pairs of coaxial opposed cylinders, a housing mounting said cylinders and having arcuate faces intermediate opposed and adjacent pairs of cylinders, arcuate plates secured to said faces and extending between the opposed cylinders to overlap the cylinder bores, and members including pistons engaging respective cylinders, said member engaging said plates for guiding thereby against rotation of the pistons within the bores.

9. In combination with an engine having cam operated axially parallel pistons disposed around a shaft, an operating cam on the shaft comprising a cylindrical drum, a cam element waved from side to side of said drum, flanges inturned from said drum; thrust means slidably engaging the outer of said flanges, and disc members rigid with the shaft and with the inner flanges.

10. In an engine having cam operated axially parallel pistons disposed in cylinders around the shaft, an operating cam comprising in integral association, a cylindrical drum element, a projecting annular cam element waved from end to end of said drum, flanges inturned near opposite ends of said drum comprising thrust faces; and thrust means bearing on said faces and secured to the bases of said cylinders.

11. In an engine in combination, annular deck members, a housing comprising a case member between said deck members, opposed coaxial cylinders disposed around and parallel to a shaft having flanges abutting said deck members, a cam drum on the shaft having plane thrust faces at its ends, and circumferentially arranged thrust slippers secured to said cylinders and deck members engaging said plane thrust faces.

12. In an engine, a cam drum member having circumferential thrust tracks substantially at its periphery, thrust means engaging said tracks, coaxial opposed cylinders disposed around a shaft and overlapping said thrust means and means to secure said cylinders including through bolts therebetween at their outer portions and bolts engaging said cylinders and thrust means at the cylinder inner portions.

13. In a cam type barrel engine, a cam on a shaft and having circumferential thrust tracks towards its periphery, axially parallel cylinders overlapping said tracks, thrust means engaging said tracks, and means securing said thrust means to said cylinders.

14. In a barrel engine comprising axially parallel cylinders disposed around a shaft, a cylindrical cam drum on the shaft having an annular reaction track in a plane normal to the drum axis, and reaction brackets secured to the cylinders engaging said track.

15. In a barrel engine comprising axially parallel cylinders disposed around a shaft, a cylinder deck member carrying said cylinders and providing a bearing for said shaft, a drum on the shaft having an exterior waved cam and having an annular flange at the cylinder end, and hook-like brackets secured to the deck member and cylinders and bearing upon said flange.

16. In a barrel engine comprising axially parallel cylinders disposed around a shaft, a cylinder deck member carrying said cylinders and providing a bearing for said shaft, a drum on the shaft having an exterior waved cam and an annular flange at the cylinder end, and hook-like brackets each secured to and between adjacent cylinders and bearing upon said flange.

17. In a barrel engine comprising axially parallel cylinders disposed around a shaft, a cylinder deck member carrying said cylinders and providing a bearing for said shaft, a drum on the shaft having an exterior waved cam and having an annular flange at the cylinder end, said flange being inturned from the drum surface and said brackets lying on the shaft side of the cylinders and engaging the inner run of said annular flange.

ROLAND CHILTON.
EDWARD S. TAYLOR.